United States Patent [19]

Salvadorini

[11] 3,793,961

[45] Feb. 26, 1974

[54] SYSTEM FOR THE CONVEYANCE OF PASSENGERS OR GOODS USING A CONTINUOUS AND FAST BELT

[76] Inventor: Rolando Salvadorini, Corso Corsica 2, Turin, Italy

[22] Filed: Dec. 27, 1971

[21] Appl. No.: 212,175

[30] Foreign Application Priority Data

Dec. 28, 1970 Italy.................................. 71300/70
Jan. 25, 1971 Italy.................................. 67248/71
Apr. 16, 1971 Italy.................................. 68254/71

[52] U.S. Cl................ 104/25, 198/16 MS, 198/110
[51] Int. Cl............................................. B65g 17/06
[58] Field of Search.... 198/16 MS, 76, 110; 104/18, 104/20, 25

[56] References Cited
UNITED STATES PATENTS

| 3,236,191 | 2/1966 | Bouladon............................. | 104/25 |
| 3,621,980 | 11/1971 | Folkes.................................. | 198/110 |
| 3,580,182 | 5/1971 | Bouladon............................. | 104/25 |
| 3,693,549 | 9/1972 | Cuenoud............................. | 198/110 |
| 3,695,183 | 10/1972 | Zuppiger............................. | 198/110 |

*Primary Examiner*—Gerald M. Forlenza
*Assistant Examiner*—D. W. Keen

[57] ABSTRACT

A system for the continuous conveyance of passengers and/or goods, consisting of at least one continuous belt having portions moving at different speeds, more particularly at least two end portions moving at a very low speed for the getting on and off of passengers and at least one intermediate portion moving at constant and high speed, or a plurality of high speed portions separated by low speed portions. The changes in speed may be obtained by changing the system width, and then the loading plane of the belt consists of strips connected at their ends to vertical pins so that said strips and the direction of motion may have different relative slopes, or the changes in speed may be obtained by changing the thickness of the system, which is supported by guided articulations moving along guides at variable distance. The system may also comprise a second continuous belt moving at constant and high speed, which is flanked along the whole or part of its run by said first belt, which forms a system for getting on and off said second belt.

17 Claims, 38 Drawing Figures

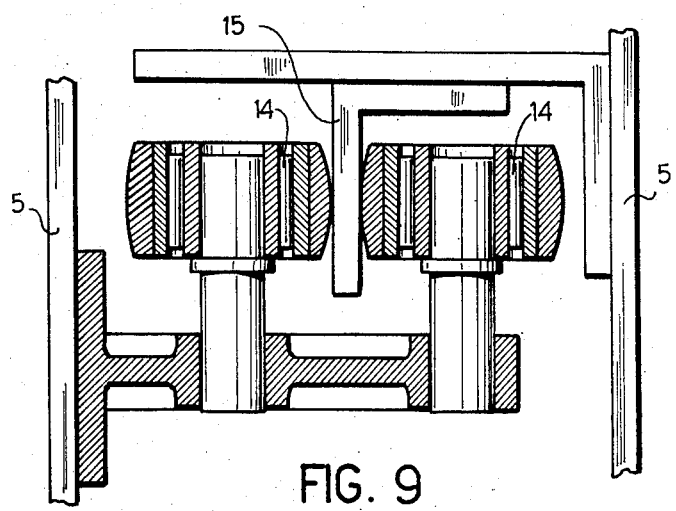
FIG. 9
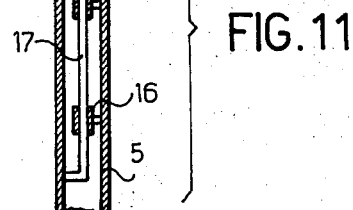
FIG. 11
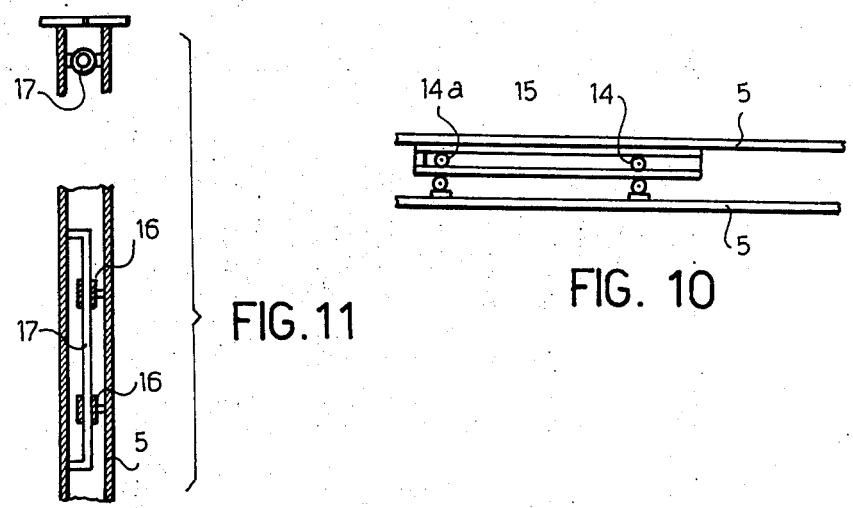
FIG. 10
FIG. 12
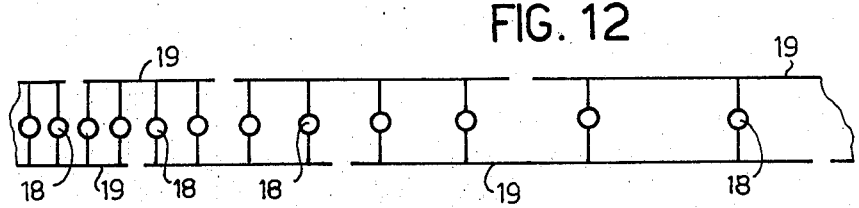

SYSTEM FOR THE CONVEYANCE OF PASSENGERS OR GOODS USING A CONTINUOUS AND FAST BELT

The present invention relates to a system for the conveyance of passengers and/or goods using a continuous and fast belt.

The known means of conveyance have great disadvantages due to the fact that they act in a concentrated way. In fact, a tram or underground line is served by a number of coaches or trains which follow one another at a predetermined frequency. Passengers wait at a stop for a tramway or a train, and when this arrives they crowd upon it. The conveyance occurs therefore in a "concentrated" way, with "discrete" entities. By such a system a lot of passengers, grouped together, come to a number of stops of no interest for each passenger, who is moreover subjected to frequent accelerations and decelerations until he arrives.

This system of conveyance is with no doubt irrational. On the contrary the continuous conveyance is more rational: a passenger gets on a continuously moving tape, without waiting for a train; the load is distributed in a more uniform way and the travel occurs at even speed and without intermediate stops, and is therefore more comfortable.

Further, even if the speed of the tape is far lower than the maximum speed of a conventional means of conveyance, the lack of waits and intermediate stops shortens the overall time of transport. A continuous tape moving at a high enough speed will have also a conveying capacity per hour greater than the capacity of any conventional system: for instance a belt conveyor running at a speed of 30 Kmph, even with a density of only three passengers per linear meter of tape, will be able to convey 90,000 passengers per hour.

A speed of this order of magnitude could be sufficient for urban transport, but it does not allow passengers to get on and off the tape without risk. This problem has been the greatest restriction and drawback of the known devices for the continuous conveyance: the need to allow passengers to get on and off easily or goods to be loaded and unloaded without damage, has limited the speed of the belt to very low values, within the range of 3 ÷ 5 Kmph, and such a speed renders the known systems unsuitable both for long distances, because of the too long travelling time, and for the short or middle distances when a great capacity of conveyance is necessary.

It is an object of the invention to provide a device for the continuous and fast conveyance of passengers and/or goods which has a great capacity of conveyance, has a low speed when passengers get on it and subsequently gradually increases its speed until the required value (for instance 30 Kmph) is attained and then proceeds at a constant speed substantially over the whole length of the journey. Subsequently the speed gradually decreases until it reaches again a low value for the getting off of passengers.

Such a system may be employed alone, for the conveyance of passengers in airports, exhibitions or along short distances in the towns, or it may be the accelerating and decelerating system for getting on and off a continuous belt conveyor at high, constant speed, which may also form a underground or superelevated device serving the whole town. In this case the accelerating and decelerating system approaches by the side the constant speed continuous belt and has at least an intermediate portion running at the same speed as the continuous tape.

The conveyor device according to the invention is characterized in that it comprises at least a continuous belt which has portions running at different speeds, more particularly at least two end portions moving at very low speed, in correspondence with the points where passengers get on and off and/or goods are loaded and unloaded, and at least one intermediate portion moving at constant and high speed.

According to a first embodiment the loading plane of said belt is composed by a set of strips always parallel with one another and longitudinally slidable with respect to one another, said strips being pivotally connected at their ends to vertical pivots in such a way that the motion can have different directions in the horizontal plane with respect to the direction of the strips, said pivots being connected to bogies moving along two fixed guides. In the portion where passengers get on or off the motion is substantially normal to the strip direction so that the belt has the greatest width, whereas in the steady-speed portions the motion is almost parallel with the strips, so that the belt has the smallest width. The speed of the loading plane progressively increases from the loading portion to the steady-speed portion because of the changes in belt width, and then it decreases in the same way from the steady-speed portion to the unloading portion.

According to a modified embodiment the direction of the motion keeps constant, and the strips are still mounted on vertical pivots so as to assume different slopes in the horizontal plane with respect to the constant travelling direction: the strips are still substantially normal to said direction in the getting on and off portions where the belt width is maximum, whereas they are substantially parallel with the motion direction in the steady-speed portions, so that the belt width will be minimum. The progressive rotation of the strips causes the speed to change from the getting on portion towards the steady-speed portion and from this to the getting off portion.

The loading surface of each strip may be formed, in both the above embodiments, by a substantially rectangular rigid plate, or by a set of parallel bars connected by hinged links, and may be solidary only to the upper surface of the strips, or to both their upper and lower surface.

According to another embodiment of the invention, the width of the loading plane keeps constant, and the speed changes are obtained by changing the thickness of the system.

The loading plane is supported by two equal sets of articulations respectively lying in vertical planes at both sides of the loading plane. Each set of articulations is composed by rods all having the same length, whose ends are hingedly connected and move along fixed guides whose distance controls by its variations the opening and closing of the articulations thereby realizing the speed changes.

Preferably the rods are connected so as to form parallelogram articulations having two by two a common joint, all joints common to adjacent parallelograms moving on the same guide, whereas the two other joints move along guides placed on opposite sides with respect to the guide of the common joints.

The loading plane of the device is divided into a plurality of sections whereof one end is solidary to an axle connecting two corresponding upper joints in the two sets of articulations, and the other end is connected by a spring to an axle connecting the two subsequent corresponding lower joints in the two sets, the intermediate portion being supported by an axle connecting the two corresponding subsequent upper joints.

Advantageously each section is formed by a set of adjacent transversal strips connected to one another so as to form a plane, rigid with respect to downward stresses caused by passenger weight, but completely folding in the opposite direction.

The return portion of the belt may pass under the active portion by rotation at both terminals or it may be employed for passengers travelling in the opposite direction.

When considerable distances are to be covered, the conveying device may comprise also a second continuous belt, closed as a ring so as to have portions moving in two opposite directions, which second belt moves at constant and fairly high speed, the first belt being the access device at variable speed (hereafter called accelerator-decelerator) of said second belt. The steady-state (regimen) speed of the accelerator-decelerator is therefore equal to the constant speed of the second belt, which flanks the first one and may form, for instance, a urban line.

Advantageously said second belt is formed by a plurality of adjacent sections connected to one another so as to rotate both around a horizontal axis and around a vertical axis, so that the belt can get over bends and gradients.

There may be an accelerator-decelerator only in some portions ("stations") of the second belt or it may flank the second belt along the whole way thereof.

Further characteristics of the invention will become apparent from the following description, with reference to the accompanying drawings, in which:

FIG. 9 is a cross sectional view of a first embodiment of the joint between two adjacent strips;

FIG. 10 is a plan view of the same joint, on a reduced scale;

FIG. 11 is a cross sectional and a plan view of a second embodiment of the joint;

FIG. 12 is a diagram of the feeding of the electrical motors;

Figure 1:
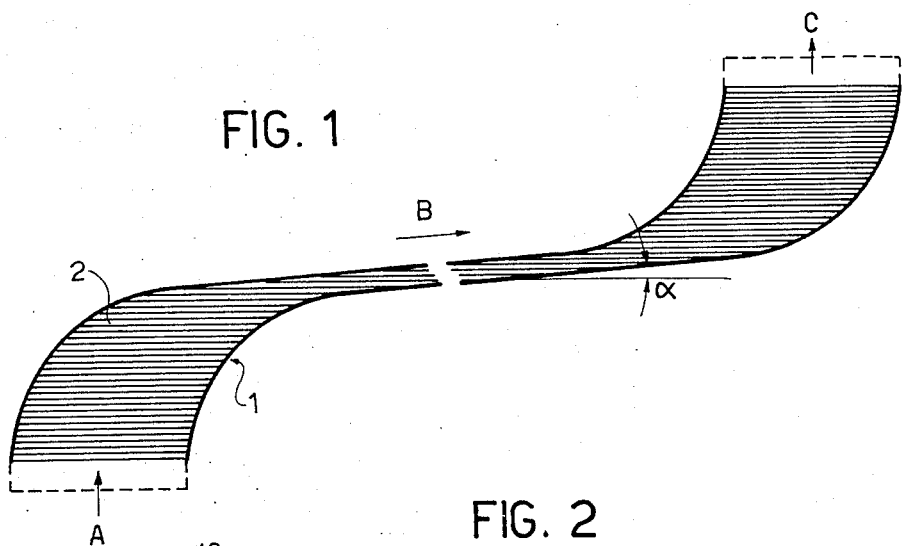
FIG. 1 is a plan view of a unidirectional conveying device according to the invention.

As shown in the drawing (FIG. 1) the system of conveyance, according to the invention, is constituted by a conveying belt, generally indicated at 1, composed of a series of strips 2.

The strips remain always parallel with one another and move in the steady-speed portion B, forming an angle $\alpha$ (FIG. 1) whose sine is equal to the ratio between the least and greatest width of the belt and is therefore also equal to the ratio between the speeds.

Figure 2:
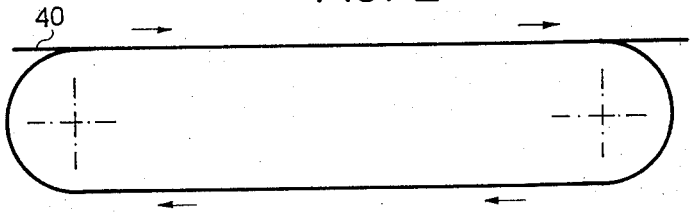
FIG. 2 is a side view of the path of the transporting system having an underground return portion.

At A and C, where passengers get on and off the motion is exactly perpendicular to the strips which makes the return of the belt from C to A under the road surface 40 feasable through a rotation of the strips in a vertical plane, as shown in FIG. 2.

Every strip consists of a suitably lightened metal beam 5, whereof at least the upper face is covered by a substantially rectangular plate; the whole of these plates constitutes the loading platform of the conveying belt 1.

In the steady-speed portion, where the strips are almost parallel to the direction of motion, the rectangular plates of the loading platform give rise to a deep indentation of the edges of the belt 1.

Figure 3:
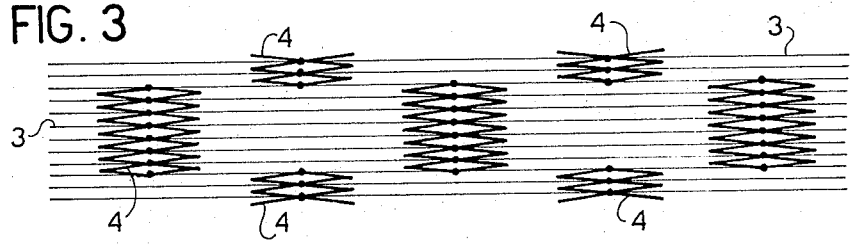
FIG. 3 is a plan view of a multi-bar strip with relative articulations.
Figure 4:
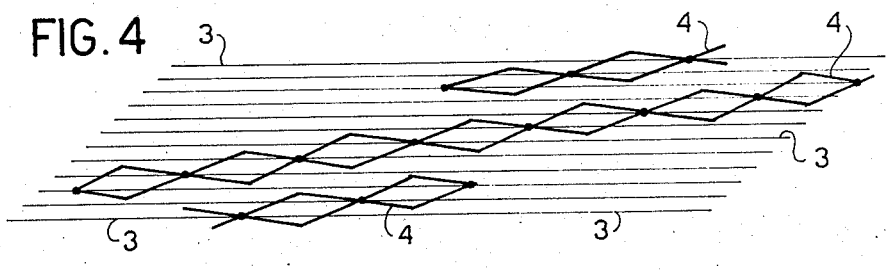
FIG. 4 shows the strip of FIG. 3 with open articulations.
Figure 5:
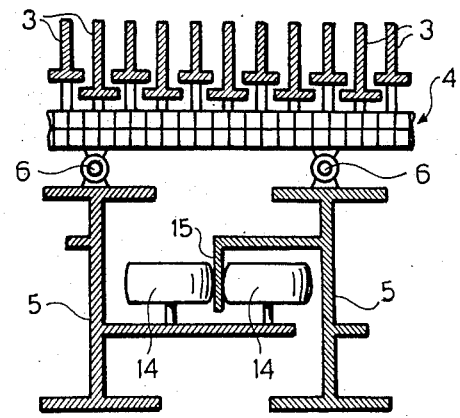
FIG. 5 is a cross section of the same strip, on an enlarged scale.

This fact may be avoided using for each strip instead of a single rectangular rigid plate, a framework of many bars carried by parallelogram articulations as FIGS. 3, 4, 5 show.

The longitudinal bars 3 are placed at a small distance from one another and are fastened by articulations 4 which are closed in the loading and unloading portions (FIG. 3) and open more and more as the movement becomes more and more longitudinal until they form an angle α with respect to the strips (FIG. 4).

We can notice that the distance between the bars 3 remains always constant, while the articulations open and close.

A cross section of a strip, with a loading platform having several bars 3, is represented in FIG. 5; in this Figure we can also see that articulations 4 are connected to the support beams 5 of strips by pin joints 6 that allow the rotation of the strips around a horizontal axis necessary for the return of the belt under the road plane.

FIG. 5 also shows the joint between contiguous strips that will be described in the following. Every strip (FIGS. 6 – 8) is hinged at its ends by its bearing structure 5 on a vertical axis pin 7 which is part of a bogie 8, sliding on fixed guides.

In a preferred embodiment, the bogie is constituted by four wheels 9, rolling two by two on two near and parallel rails 10, each of these rails working with both upper and lower tread; the latter is engaged by another wheel 11, keyed a little loose.

Figure 6:
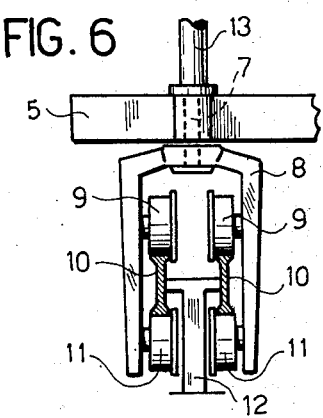
FIG. 6 is a cross section of a strip bearing bogie.
Figure 7:
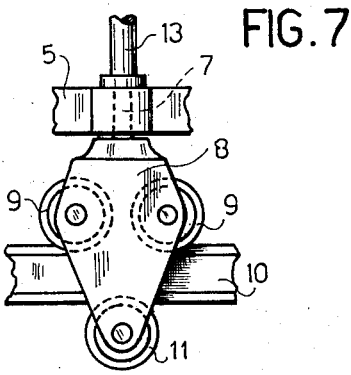
FIG. 7 is a side view of the same bogie.
Figure 8:
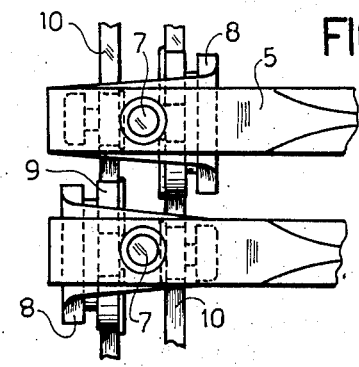
FIG. 8 is a plan view of strips and bogies.
Figure 8:
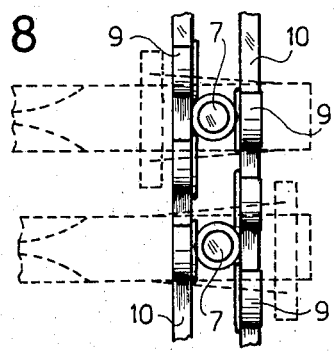

The bogie has substantially the form of a fork, (FIG. 6), whose inner or outer walls support three wheels each (FIG. 7).

The rails are fixed by means of supports 12.

In case, one of wheels 9 placed on a wall of the fork, may be eliminated, so that, arranging the bogies in a staggered way (FIG. 8), a better exploitation of the distance between the bogies is obtained which is particularly useful when these are brought very close to each other (loading and unloading portions).

In the acceleration portion the distance between the bogies increases until a maximum is reached in the steady-speed portion B. With a guiding system as described the bogies can only follow the rails; these may curve both in a horizontal and in a vertical plane, provided that the radius of curvature is not less than a certain value.

The two guides at the two ends of the strips, (everyone made by a couple of rails) will have a certain shape depending upon the desired law of motion, but in any case they are obtained transferring, parallel to the strips, a guide in relation to the other by a quantity equal to the length of the strips.

In this way, for any shape of the guides, the distance between them, in direction of the strips, is therefore equal to the length of the strips, that therfore remain always parallel one to another.

In the acceleration and deceleration portions, the bogies will follow the shape of the guides turning about the vertical pins 7.

The strips are subjected to a slow motion perpendicular to their direction and to a motion along their direction.

The first one is a uniform motion at constant speed, the second is a motion whose speed is null in the points where passengers get on, gradually increases until a maximum remaining then constant for the whole regimen portion, and gradually decreases in the deceleration end portion until becomes zero where passengers get off. In the steady speed portion the two orthogonal components of the motion form the angle α of the resulting motion of the strips.

If in the acceleration portion, it is desired the longitudinal component of the motion to have a constant acceleration, the guides shall have a parabolic shape with vertex of the parabola in the loading point, and they will continue, at the end of the acceleration, according to the tangent to the parabola.

Thus, besides the component transversal to the strips that is always present, a uniformly accelerated motion is achieved followed by a uniform motion and lastly, at the arrival terminal, a uniformly delayed motion until the get off.

The shape of the guides must be such as to give rise to a not too high acceleration in order not to jeopardize passengers.

The pins 7 may stick out from the loading plane of the strips thereby forming hold rods 13 for passengers (FIGS. 6 – 7). Other intermediate hold rods may be connected to the intermediate bars of the multi bar plane of each strip. During the motion of the belt the strips must be always parallel and run longitudinally with respect to one another.

FIGS. 9, 10, 11 show two preferred embodiments of the devices allowing this motion.

FIG. 9 shows that the supports of two wheels with roller bearings 14 are solidary to the bearing structure 5 of a strip 2, said roller bearings running on the opposite faces of a plate 15 solidary to the support 5 of the following strip.

The linkage is placed substantially in the middle of the strips and it permits to keep constant the distance thereof and to support traction and compression strains perpendicular to the axis of the strips. Where the strips have the greatest slope (portion B of the belt) the wheels 14 are in a position of end-run 14a on the plate 15 in order to support better the strains (FIG. 10).

The length of the plate 15 is such as to allow any required sliding between two adjacent strips.

According to another preferred embodiment (FIG. 11), the linkage may consist of one or more bearings with axial sliding 16 solidary to the bearing structure 5 of a strip and running on a shaft 17 solidary to the support of the subsequent strip.

The above ties permit also the rotation of the strips on the vertical plane to make the return of the belt feasable below the road plane. In fact, as shown in FIG. 5, for carrying out the rotation of the whole belt, every strip turns around the contact point between the wheels 14 and the plate 15, or, in the second embodiment, around the axis of the axial slide. This rotation produces an increase of the distance between the pins 6 to which the articulations are connected, which articulations easily make up by slightly opening.

The movement of the belt may be obtained by systems of geared wheels, chains, etc.

Preferably however direct current electrical motors may be employed, connected directly, or through a reducer, to one or more wheels of the bogies 8, or the motion may be transmitted by motors connected to the bogies and meshing with a fixed rack through a geared wheel.

Advantageously only some bogies will be driving and the others will be driven bogies.

The motors may be of the low voltage type with series excitation and may be connected all in series with one another: in this way a feeding at uniform current is obtained and the produced pull will be independent of the speed. The voltage will share proportionally to the speed of the motors and an efficient traction will be obtained throughout the whole range of speeds.

FIG. 12 shows a preferred arrangement of the connections of the motors. As shown, motors 18 are connected, two by two in parallel so as to avoid momentary current breaks and the groups of two motors are connected in series by fixed conductors 19. The feeding may be obtained by brushes creeping on conductors 19 which may have some interruptions to permit the connection in series of the groups of motors, while retaining a mechanical continuity to provide always support for the brushes.

The breaks in the conductors are equally spaced in the constant speed portions and are more and more closely spaced in the terminal portions.

The operation of the above conveying system is as follows:

passengers at A get on the strips slowly moving (for instance 3 Kmph) in the transversal direction. In this portion the belt has a great width (for instance some meters) so that it can take up many passengers. Due to the gradual acceleration and to the motion passing from transversal to almost longitudinal to the strips, passengers are gradually and automatically arranged in a line, in the portion at high and constant speed (for instance 30 Kmph). In this portion the belt will be narrow (for instance 60 ÷ 70 centimeters). The ratio between the greatest and least width is equal to the desired speed ratio.

Similarly, at their arrival passengers are gradually slowed down and gradually and automatically pass from the line position to a side by side position and they arrive at the road plane at a low speed (equal to the get on speed).

During the whole travel passengers, if they will, may go on walking.

Passengers, if they will, may hold on to the fitting vertical hold rods disposed on the edges of the loading plane and to other intermediate rods, if any.

The return portion may be not in use, and then the belt, at the end of the portion C, will pass by a rotation on the vertical plane below the road plane and will have the same configuration as the active portion, and it will come back to the surface in correspondence of the loading portion A.

The return portion may on the contrary be used for conveying passengers and/or goods in the other direction. This case is shown in FIGS. 13 and 14.

Figure 13:
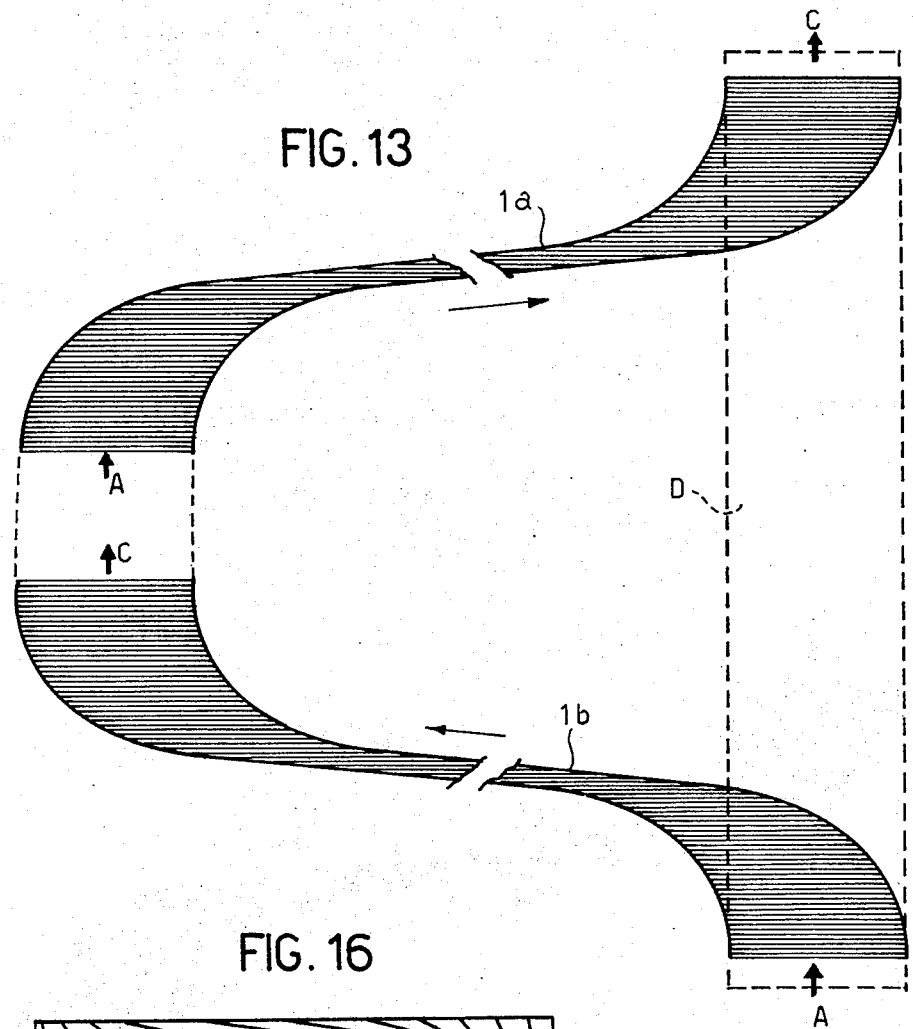
FIG. 13 is a plan view of a first embodiment of a bidirectional conveying system.
Figure 14:
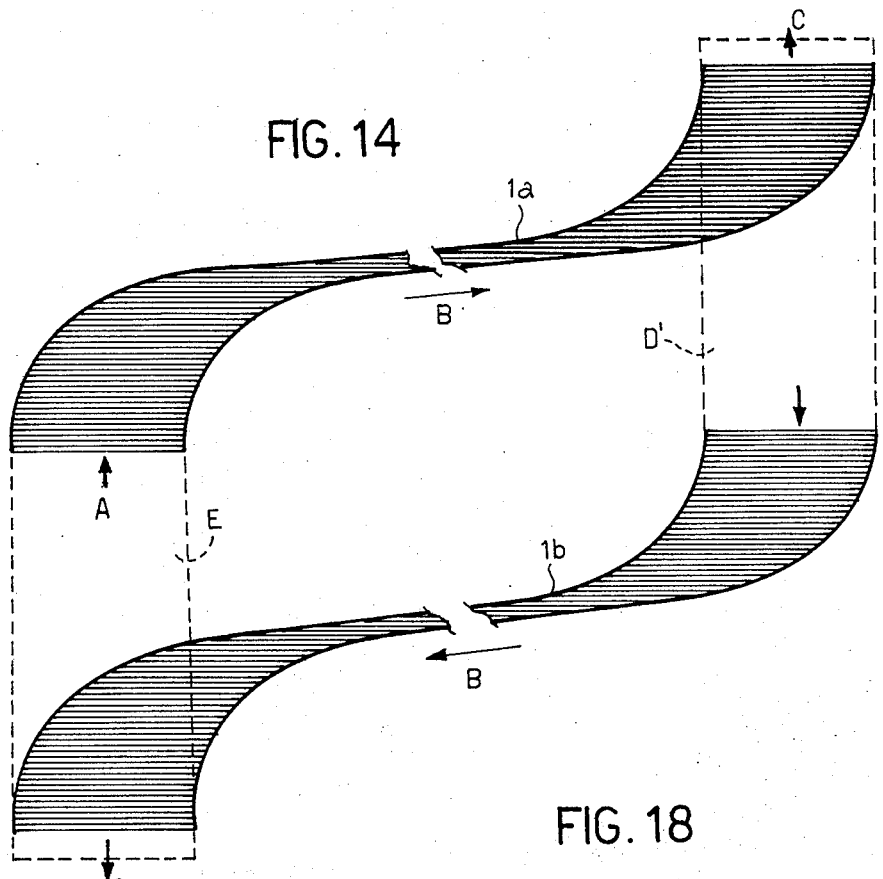
FIG. 14 is a view similar to FIG. 13 and showing another embodiment of a bidirectional conveying device.

In the embodiment of FIG. 13, at the end of the portion C of the forward run 1a, the belt rotates by half a turn in the vertical plane to reverse its motion and because of this rotation, it passes under the road plane. The belt moves in the subsoil for a certain distance (connecting portion D) at whose end it rotates by another half a turn and goes back to surface and reverses again its motion.

The portion where the belt 1 comes back to the surface is the loading portion A for the return run 1b, which is symmetrical with respect to run 1a.

Passage from zone C of return run 1b to zone A of forward run 1a occurs in the subsoil and without need of further rotations, since in these portions the two runs of the belt move in the same direction.

In this embodiment, the loading plane of the strips is always the same for both directions of travel; both rotations in the vertical plane occur at only one terminal point of the tape (at the right in FIG. 13). With such an arrangement, the two directions of motion are displaced by an angle 2 $\alpha$ that for long distances may produce a too long portion D of the belt.

In order to avoid this angle and to have the two directions of motion parallel, at the terminal point where the belt does not reverse its motion, on the left in FIG. 13, it is possible slightly to rotate the strips in the horizontal plane by an overall angle of 2 $\alpha$.

In the embodiment of FIG. 14, at the end of the unloading portion C of the forward run 1a, the belt reverses its motion rotating by half a turn and passes under the road plane in the connecting portion D'; at the end of this, it comes back to the surface without reversing its motion and the return run is parallel to the forward one; the loading plane of the return run is formed by the bottom surface of run 1a of the belt.

For making this possible, every strip is provided with a top and a bottom loading plane. Past the portion C of the return run, a new rotation of the loading plane occurs, similar to the preceding one, whereby the motion of the belt is again reversed. The belt passes below the road plane in the connecting portion E at whose end it comes back to surface and forms the loading portion A of run 1a.

In the embodiment of bidirectional belt shown in FIG. 14 the hold rods must stick out both from the upper and from the lower surface of the belt; thus a series of rods will be present in the subsoil along the whole route of the belt, whereas in the case shown in FIG. 13, hold rods will pass in the subsoil only in the connecting end portion D.

The above system of conveyance may be periodical, that is after the deceleration portion there may be a portion moving at constant low speed; when the time required for operations at low speed is over there may be again an acceleration and a high speed portion and so on.

Figure 15:
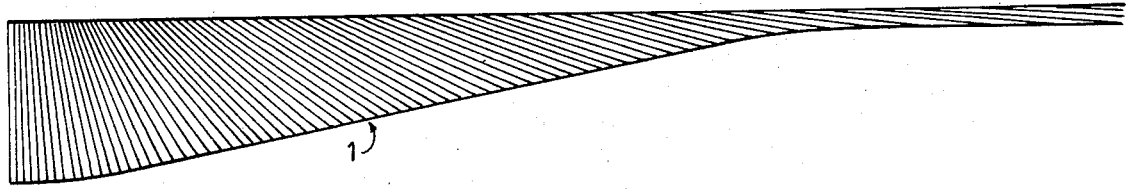
FIG. 15 is a plan view of the accelerating portion of a modified embodiment of the device according to the invention.

In the variant shown in the Figures from 15 to 19, the direction of motion keeps constant and strips 2 turn about pivot pins 7, thereby taking different slopes in the horizontal plane with respect to the motion direction. As shown in FIG. 15 there is a loading portion A in which strips 2 are substantially perpendicular to the direction of motion, and a steady-speed portion B where the strips are almost parallel to the motion direction.

In the unloading zone C (not shown) the strips are again substantially perpendicular to the motion. In the intermediate zones the slope of the strips changes progressively between the two extreme positions.

Owing to the progressive sloping of the strips, the width of plane 1 decreases and consequently the speed thereof increases. By suitably choosing the values of the slope and of the length of the strips any desired ratio between the greatest and least speed may be achieved.

In this variant every strip is still guided at its end by the bogies 8 and guides formed by rails 10 so that its slope, with respect to the motion direction, is at any moment exactly determined. In fact in any point of the moving plane 1 the ratio between the transversal distance of the guides and the length of the strip gives the sine of the angle formed by the strip with the motion direction.

Figure 16:
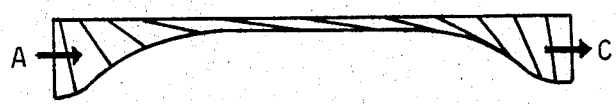
FIG. 16 is a plan view of a dissymmetrical conveyor.
Figure 17:
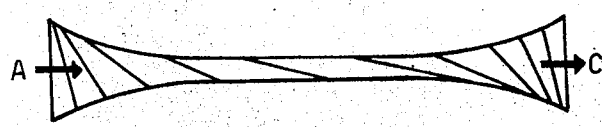
FIG. 17 is a modified embodiment of FIG. 16, and shows a symmetrical conveyor.

By changing the distance between the guides in the different points of the route, all desired slopes of the strips are obtained. One pair of rails 10 may be rectilinear and the other may progressively approach or depart therefrom so that the plane 1 may have the configuration of FIG. 16 or the routes of the two pairs of rails may be symmetrical and the conveyor has the configuration shown in FIG. 17.

Also in this case the pins 7 may stick out from the loading plane so as to form hold rods for passengers. The strips are still bound to one another as shown in FIGS. 9 and 10.

Figure 18:
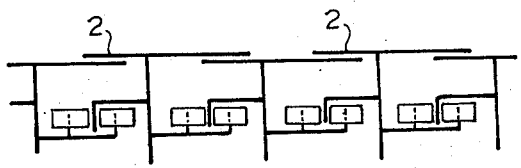
FIG. 18 is a cross section of a first kind of rigid strips.

During their motion the strips 2 are subjected also to a little angular displacement with respect to one another; in order to avoid too large gaps between adjacent strips which gaps, owing to the length of the strips, are produced also by little rotations, the rectangular rigid plates forming the loading plane of the strips should partly overlap as shown in FIG. 18. In this case the plane would not be perfectly even, but it would have unevennesses in correspondence of every strip.

Figure 19:
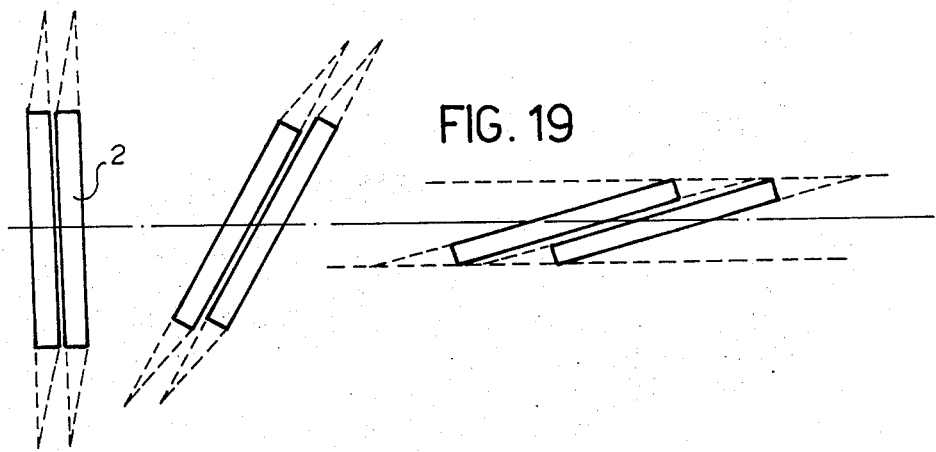
FIG. 19 is a plan view showing rigid strips with triangluar ends.

Moreover when the belt runs at steady speed the floor would have indented edges and, in order to obtain a continuous edge, the strips 2 should end with triangular appendages (FIG. 19), that however would be encumbering in the acceleration and deceleration protions.

To obviate all these inconveniences the loading plane of each strip may be composed alos in this variant by bars 3 as shown in FIG. 3. By using an adequate number of strips it is possible to reduce to a minimum the little angular displacement caused by the rotation of the strips. This displacement may be made smaller than 1°, and may be obtained also without resorting to excessive clearances or to slits in the points of connection between bars 3 and articulations 4.

In order to eliminate any doubt in the initial slanting of the strips pins 7 may be provided with stop devices, or the breaks in conductors 19 may be arranged so that at the beginning of the rotation of the strips 2, only the motor placed at the advancing end is fed.

Advantageously however the strips may be slightly rotated also in portions A and C of the conveyor. In this case however the return run of the belt must lie in the same plane as the forward run, since the slant of the strips makes impossible a rotation thereof in the vertical plane.

In the embodiment shown in FIGS. 20 to 33, the width of the loading plane remains constant and the speed changes are obtained by varying the overall thickness of the assembly.

Figure 20:
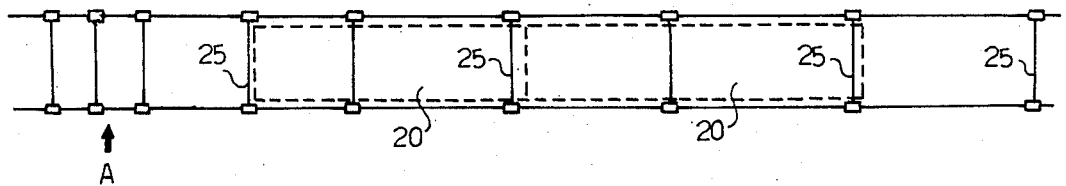
FIG. 20 is a plan view of another embodiment of the invention.

As shown in FIG. 20, the loading plane of the belt is divided into a plurality of sections 20 having a constant width and an utilizable length increasing from the end portions A and C where the belt moves slowly, towards the central regimen portion B where the conveyor moves at constant and fairly high speed.

Figure 21:
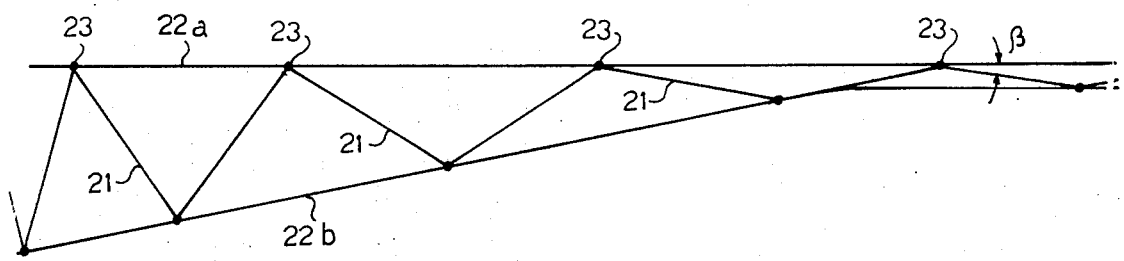
FIG. 21 is a side view of the embodiment of FIG. 20.
Figure 22:
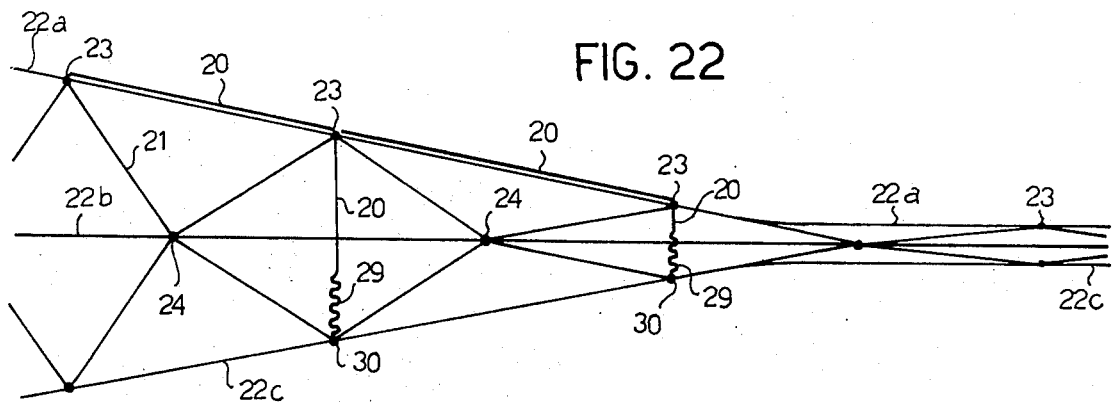
FIG. 22 is a view similar to FIG. 20, with a parallelogram articulation.

The means for obtaining the speed variations is shown in FIGS. 21 and 22. As shown in FIG. 21, the two side edges of the loading plane are supported by hingedly connected rods 21 having a constant length and placed in a vertical plane: the ends of the rods move along the guides 22a, 22b whose distance from each other progressively decreases from the ends of the route of the conveyer towards the central steady-speed portion where the distance keeps constant: as guides 22a, 22b approach each other the joints 23 beteween rods 21 move progressively apart from each other, thus increasing the speed of the loading plane. The ratio between the highest and lowest speeds that can be reached, is equal to the ratio between the values of the cosine of the angle $\beta$ that the rods form with the guide 22a in the steady-speed portion B and in the end portion A.

Rods 21 are advantageously connected so as to form parallelogram articulations (FIG. 22) having two by two a common joint 24. Such an articulation is nothing but the duplicate of the one in FIG. 21. The joints 24 common to adjoining articulations move along a guide 22b placed between two guides 22a, 22c and lying in the same vertical plane as these.

Figure 23:
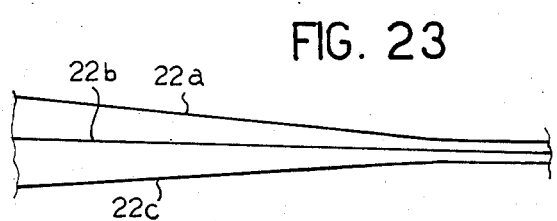
FIG. 23 shows a symmetrical conveying system.
Figure 24:
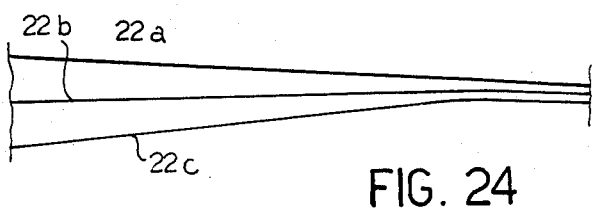
FIG. 24 shows a device with straight loading plane.
Figure 25:
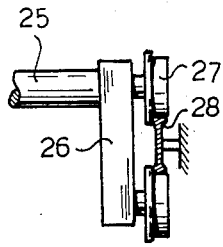
FIG. 25 shows a preferred embodiment of a bogie allowing the movement of the joints of the articulations along the guides.

Guide 22b may be rectilinear and guides 22a and 22c may be symmetrical with respect thereto so that the conveyer has the configuration shown in FIG. 23; alternatively if a perfectly rectilinear loading plane is desired, the upper guide 22a is rectilinear and guides 22b and 22c approach it progressively from the end portions towards the steady-speed portion, as shown in FIG. 24.

The corresponding joints of the two parallel sets of articulations are connected by axles 25 (FIG. 20) which support, at their ends, means for sliding along guides 22a, 22b, 22c.

In a preferred embodiment (FIG. 25) this means consists of a bogie 26 having two or three wheels 27 engaging a double tread rail 28 which rail stands for guides 22a, 22b and 22c.

FIG. 22 further shows that every section 20 of the loading plane has one end fastened to the axle 25 which joins two corresponding upper joints 23, passes around the axle 25 joining the upper joints of the following articulation and has the other end fastened by springs 29, to the axle connecting the lower joints 30 of the following articulation.

While moving from a terminal portion to the steady-speed portion every section stretches spring 29: this stretching is maximum for angles $\beta$ of 45° and decreases for smaller or larger angles.

The change in speed and therefore in the distance between guides 22a, 22b, 22c, must be very slow for sake of stability of passengers.

Figure 26:
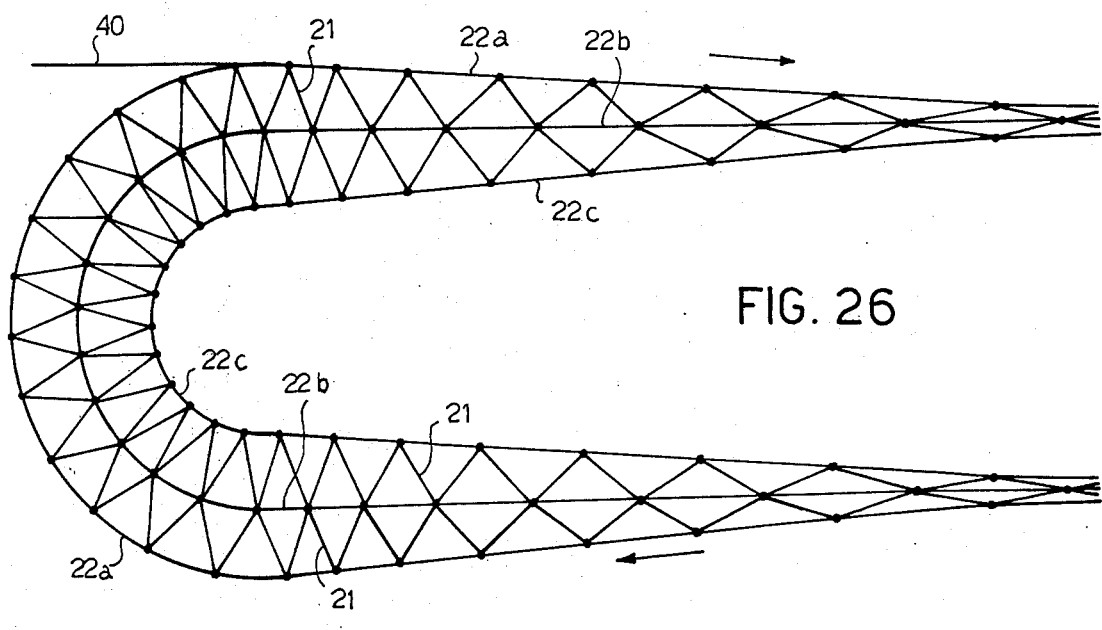
FIG. 26 shows an end portion of an articulation of the device according to this embodiment.

The sets of hingedly connected rods 21 are suitable to allow the conveyer to return below the road plane by rotating in the vertical plane as shown in FIG. 26. Also the return movement may be subject to accelerations and decelerations like forward movement, thereby reducing to a minimum the number of articulations. The rotations at the ends of the route may occur even with a relatively small radius of curvature.

FIGS. 27 to 30 show the structure of the loading plane of this embodiment of the conveyer more in detail.

Figure 27:
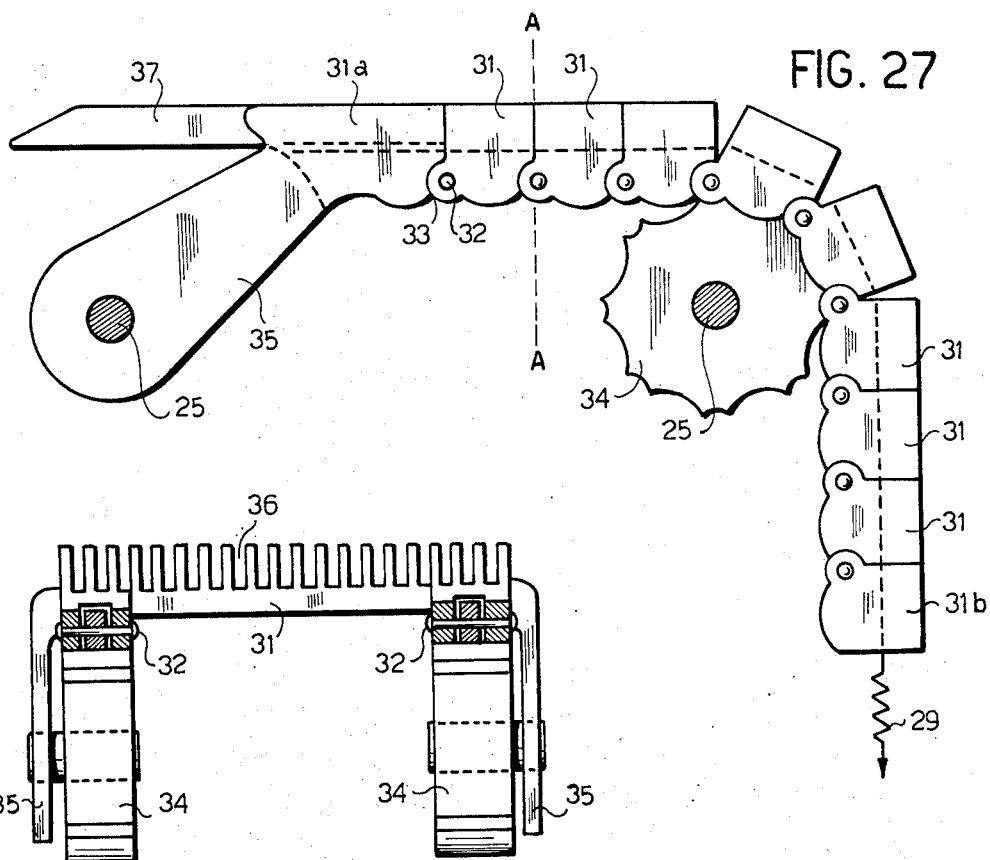
FIG. 27 is a side view of a portion of the loading plane.

As shown in FIG. 27 every section 20 at the loading plane consists of an assembly of parallel strips 31 hingedly connected to one another by pins 32 and lugs 33 which allow the strips to rotate around wheels 34 supporting the section in an intermediate portion.

The horizontal portion of every section is the active portion of the loading plane while the vertical portion is inactive. Strip 31a at one end of the active portion is connected with arms 35 to the upper axle 25 of an articulation whereas strip 31b at the free end of the inactive portion is fastened by springs 29 to the axle which connects the lower joints 30 of the subsequent articulation (FIG. 22). Wheels 34 are idly mounted on the upper axle 25 of this articulation so as to allow the loading plane to slide easily when the supporting articulations open, and the surface of the wheels is provided with several protrusions and recesses which are engaged by the lower parts of strips 31 and lugs 33.

Figure 28:
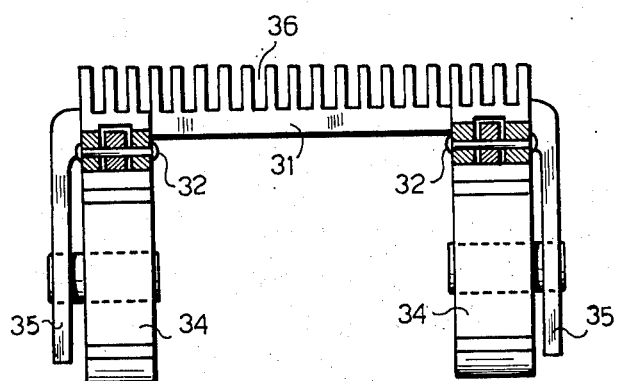
FIG. 28 is a cross sectional view taken along line A — A in FIG. 27.

Advantageously the adjoining strips are connected at least in two points and their surface is provided with longitudinal grooves 36 parallel to the direction of motion of the conveyer (FIG. 28).

The connection between strips 31 and their shape allow a complete rigidity and robustness for downward loads (weight of passengers) and a complete flexibility in the opposite direction so as to allow the rotation around wheels 34.

Figure 29:
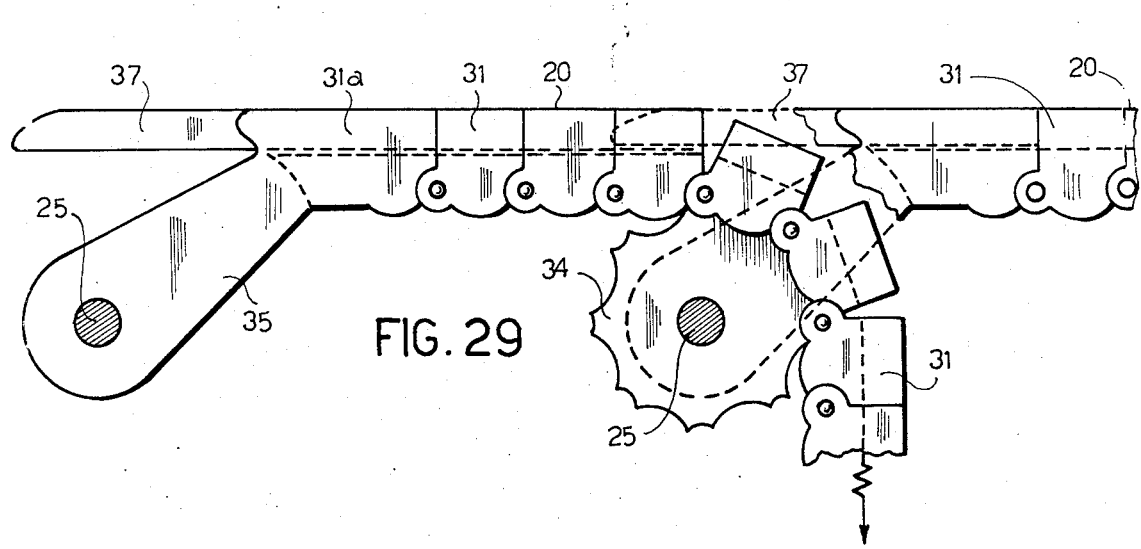
FIG. 29 and 30 are elevation and plan views of the connection between two adjacent portions of the loading plane.
Figure 30:
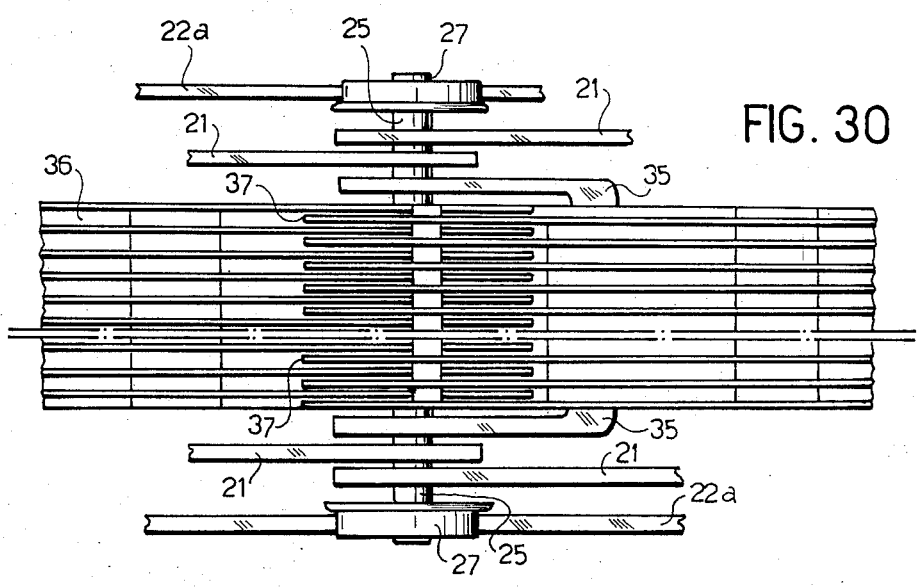

The connection between two adjacent sections is shown in FIGS. 29 and 30. Therein it is shown that strips 31a are provided with teeth 37 whose free end is tapered and which enter without contact into grooves 36 of the adjacent section thereby realizing the continuity of the loading plane. In the acceleration and deceleration portions these teeth slowly move within grooves 36 of the adjacent section without danger for the passengers.

Figure 31:
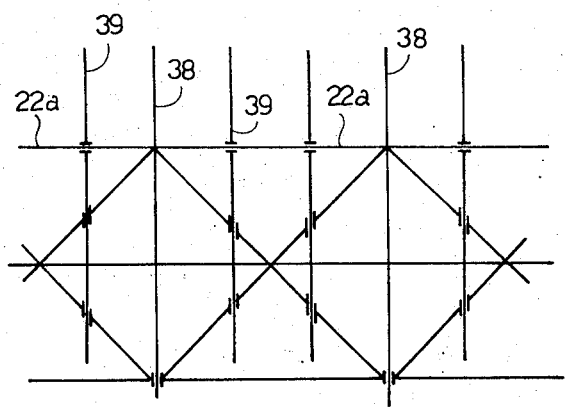
FIG. 31 shows the arrangement of the bars that passengers can hold.

Also in this embodiment the conveyer may be provided with hold rods shown by 38 in FIG. 31, carried by the joints and jutting from the two sides of the loading plane.

Rods 38 are, as usual, very close to one another in the loading and unloading portions, where the articulations are almost completely closed, whereas they are rather apart from each other in the steady-speed portion where the articulations are quite open.

If the maximum distance between rods 38 is considerable, some intermediate holds may also be provided which consist either of parallelogram articulations fastened to the hold rods or of other rods 39 connected to the main articulations.

The hold rods 38 may also be connected by cords which lie losse in the low speed portions where rods are very close to each other and are tight in the high speed portions. The conveyer according to the invention, may be also used for superelevated or underground conveyance. More particularly, as shown respectively in FIGS. 32 and 33, in which the level of the road plane is marked with 40, the access ramps, moving either up or down, may form integrant portions of the conveying system with the advantage that auxiliary means for getting on and off the tape, such as escalators are not necessary. The sloping portions of the conveyer might form, in this case, the acceleration and deceleration portions, whereas the horizontal portion of the route may form the constant speed portion. Passengers would get on and off the sloping portions at the road level.

The movement of the conveyer may be obtained with any of the means indicated in connection with the preceding embodiments. If several motors are used, they can be connected to the joints of the articulations and be keyed directly or through a gear to one of wheels 27 of FIG. 25. The connections between the motors may be also realized, by means of cables palced along the system.

Figure 34:
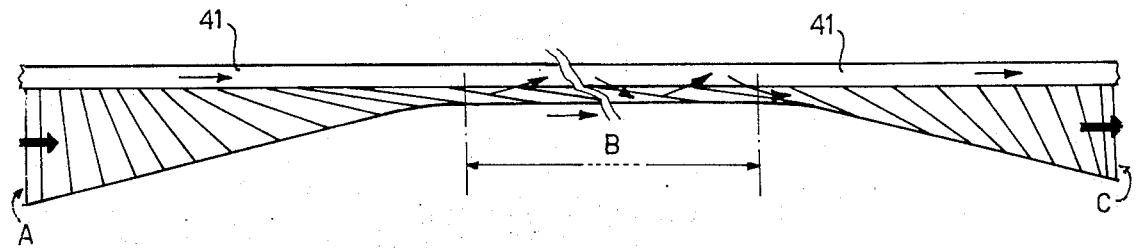
FIG. 34 shows a device according to the invention employed as an accelerator-decelerator for getting on and off a constant speed belt.

The above mentioned systems may form an independent conveyer for short or middle distance, or, in case of long distance, they can act as accelerator-decelerator for the access to a continuous belt moving at constant and high speed, as shown in FIG. 34, where the constant speed belt is marked with 41. This belt may form a long, closed ring, for instance an urban line.

In the steady-speed portion the conveying system according to the invention flanks the constant speed belt, and their loading planes form a single floor, the length of the portions that moves at the same speed as the constant speed belt being determined according to the time that it is rated necessary to move a step passing from the accelerator-decelerator to the constant speed belt or vice versa.

If the two directions of the motion of the constant-speed, continuous belt are parallel with each other, the system of FIG. 15 may be used by passengers travelling in both directions.

Figure 35:
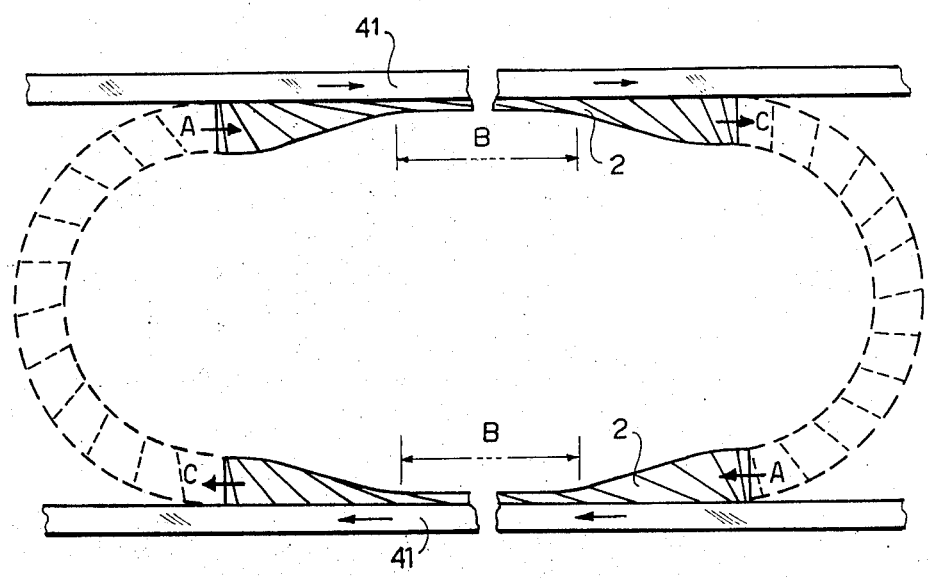
FIG. 35 is a plan view of a double accelerator-decelerator for getting on and off two parallel belts moving in opposite directions.
Figure 32:
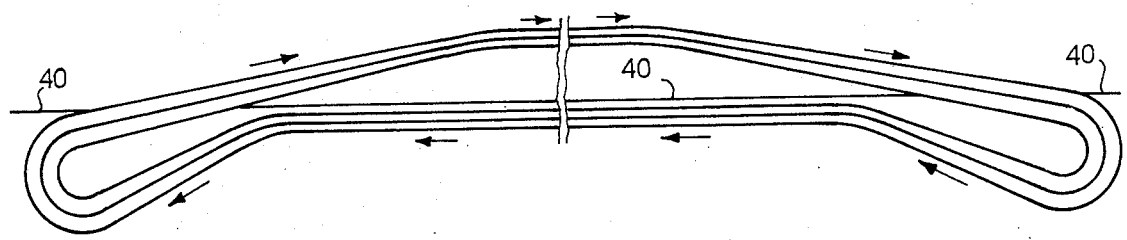
FIG. 32 shows a device suitable for superelevated lines.
Figure 33:
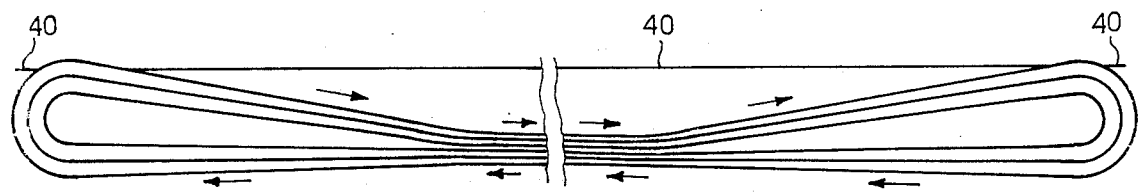
FIG. 33 shows a device suitable for underground lines.

In this case (see FIG. 35) the return of the accelerator-decelerator is obtained with a rotation in the same horizontal plane instead that below the ground level, and the return portion constitutes an accelerator-decelerator for the other sense of travel.

Moreover, by such an arrangement, the strips may have at points A and C and in the bending portion an initial slant with respect to the direction perpendicular to the motion, so as to avoid an initial rotation in the wrong direction.

In this case the curved portion is covered, and passengers get on at A and get off at C.

Figure 36:
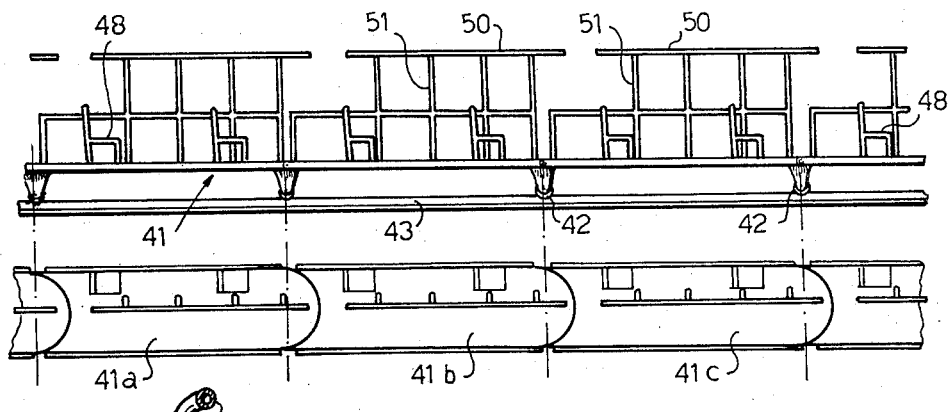
FIG. 36 is a side elevation and a plan view of a preferred embodiment of the constant speed continuous belt.
Figure 38:
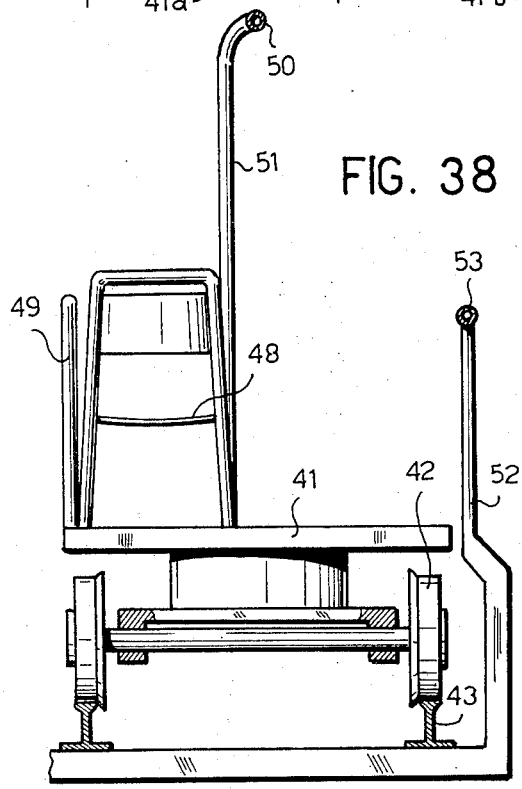
FIG. 38 is a cross sectional view of the same carriage.

A preferred embodiment of the continuous belt at constant speed is shown in FIGS. 36 and 38. As shown, belt 41 is divided into a certain number of adjacent sections or carriages 41a, 41b . . . connected to one another so as to allow the belt to pass over both bends and slopes, and, in correspondence of the connections between two adjacent sections, it is supported by wheels 42 running on rails 43.

Figure 37:
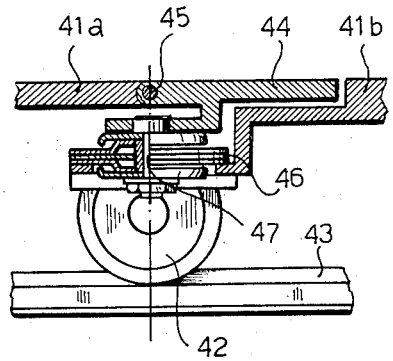
FIG. 37 is a view, partly in section, of a carriage of the belt shown in FIG. 36.

As shown in FIG. 37, two adjacent sections are supported by the same couple of wheels. Preferably every section or carriage fits in the adjacent one by means of the articulate semicircle 44. The portion 44 of every section is connected to the rest of the loading plane by a horizontal pin 45 permitting its rotation in the vertical plane.

The adjacent end portions of two sections are moreover connected by bearings 46 to a vertical shaft 47 and hence they can also rotate in the horizontal plane.

On the loading plane of belt 41, on the portion opposite to the entry, seats 48 may be fastened leaning against a wall 49 fastened to the belt; the spacing of the seats must be sufficient to provide room also for standing passengers, if any, whereas the remaining portion is clear for passengers that prefer to walk along the belt in order to save time or for people who get on or off the belt.

Horizontal holds 50 fastened to rods 51 allow standing passengers to hold on to them. On the entry side of the belt there may be a steady parapet 52 (FIG. 38) provided with a handrail 53 sliding at the same speed as the belt. In case the whole upper portion of wall 52 may slide. Wall 52 must be discontinued in correspondence to the portions where passengers get on and off, that is in correspondence of the accelerator decelerator. The handrail may return below the belt plane, or preferably the return run may form the handrail for the constant speed belt that travels alongside in the opposite direction. The section of the handrail in FIG. 38 is circular in order to allow the easy rotation also in the horizontal plane so as to serve at the same time two continuous belts travelling in opposite directions.

The above-described type of continuous tape may be named "open." It is also possible to obtain a continuous tape of "closed" type in which the parapet of the side of access is formed by a continuous row of easily opening doors provided with springs that close and lock the doors. In correspondence of the connections of adjacent carriages of the belt, bellows are provided for allowing the belt to pass over bends and gradients.

The motion of the belt may be obtained by means of electrical motors placed at the entry portion, which motors transmit the motion to a rack connected to the lower portion of the belt.

It is however advantageous to provide at least some of the carriages with their own electrical motors.

In order to avoid noise, the wheels may be covered with rubber and roll on plane surfaces that replace the rails.

In this case, the belt can be guided by rollers having vertical axis, covered with rubber, placed on the side walls of the belt and rolling on fixed and plane side guides.

The equality of the speed of belt 41 and of the accelerator-decelerator 1 where passengers get on belt 41 is obtained with any suitable means, for instance with a tachymetric dynamo whose voltage is proportional to the difference in speed between belt 41 and plane 1 of the accelerator-decelerator in the steady-speed portion.

In this portion the surfaces of belts 1 and 41, placed side by side, form a single plane which is at rest with respect to passengers, so that their passage from the accelerator-decelerator to the belt or vice versa is extremely easy. The length of the steady-speed portion of the accelerator-decelerator should be such as to allow 4 or 5 seconds for the passage of passengers from one belt to the other.

Obviously the hold rods should be missing on the accelerator-decelerator, on the side where passengers get on belt 41.

Advantageously the accelerator-decelerator might also be continuous instead of being placed only at the "stations;" that is, at the end of the deceleration portion the strips might pass below the road plane and return to the ground level some metres farther moving always in the same direction.

This system might be used particularly in the realization of moving roads, without crossings, while the preceding system with several "stations" is particularly suitable for underground or superelevated railways.

The conveying system, in which a constant speed belt is used, has also the same advantages we have mentioned for the variable speed system. Further, the load on the belt is not concentrated in a few points but it is evenly distributed throughout the whole route; consequently, the supporting structures have to bear lighter loads and are less expensive. By using narrow and light belts, the bearing structures of superelevated railway may be designed lighter and the section of tunnels of an underground line, may be smaller, so that the installation cost is greatly reduced and the higher cost of the system according to the invention with respect to the conventional means of transport may be compensated. In case of underground ways the necessary ventilation, if made in the direction of motion, can attenuate or annul the wind effect due to the speed.

In order to achieve this, a tunnel should be provided for each direction of motion, as it is evident.

In the case of superelevated railways the belt may be placed within a cylinder, for instance of 2,5 ÷ 3 meters of diameter, whose upper portion at least is made of a transparent material.

In the case of constant speed belt, with accelerator-decelerator system the safety means are very important. For instance at the end of the access portion, elastic bars may be provided, bearing big turning vertical rollers of rubber that push either out or in passengers that, at the end of the passage time happen to be in a position intermediate between the continuous belt and the access system.

What is claimed is:

1. A system for the continuous conveyance of passengers and/or goods, comprising at least one belt having forward and return runs travelling in substantially opposite directions and connected at their ends so that said belt follows a closed path, said belt being adapted to move at a speed gradually changing from one zone to another, the speed of said belt being very low in at least two end portions where passengers get on or off said belt, the speed of said belt being constant and relatively high in at least one intermediate zone, said belt including a loading plane adapted to bear standing or walking passengers, said loading plane comprising a set of horizontal strips identical with one another and arranged side by side, articulations connecting said strips so that said strips slide longitudinally with respect to each other, the loading plane of said belt being formed by a grid sufficiently close with respect to the foot size, said articulations being closed in the portions at low speed and being completely open in the high speed zone, vertical pins for mounting each said strip at the ends thereof, bearings connected to said vertical pins, a plurality of fixed guides along which said bearings are arranged to slide, the distance between said fixed guides being such as to allow said strips to take any slope in the horizontal plane, the direction of movement of said belt being substantially perpendicular to said strips in the low speed zones, the direction of movement of said belt being almost parallel with said strips in said high speed zone and a loading surface for each said strip, said loading surface comprising a set of parallel and equidistant bars.

2. The system in accordance with claim 1 wherein said strips each include a tough, light bearing structure and a sleeve for connecting adjacent strips, said sleeve being supported by said bearing structure of one of said strips, said sleeve being arranged to slide on a shaft supported by said bearing structure of an adjacent strip for allowing relative longitudinal sliding of adjacent strips, said connection keeping said strips oriented in a constant direction and parallel with one another along the whole belt path, the direction of movement of said belt being exactly perpendicular to said strips in the low speed zone where passengers get on the belt, said direction of movement having a longitudinal component which increases towards the high speed zone where the motion is substantially parallel with said strips, the longitudinal component decreasing towards the subsequent low speed zone where the motion is again perpendicular to the constant direction of said strips and wherein said fixed guides are spaced by a distance which, measured in the direction of said strips, is always identical with the length of said strips, and which, measured normally to said fixed guides, decreases from said low speed zones towards said high speed zone, the shape of one said guide being obtained by that of the other by a translation in the direction of said strips equal to the length thereof.

3. The system according to claim 1 wherein two of said adjacent strips are connected by two roller bearings supported by said bearing structure of one of said two strips, a plate connected to said bearing structure of said other strip, said roller bearing moving on two faces of said plate, the connection of said plate and said bearing structure allowing a relative longitudinal sliding of said strips and keeping said strips oriented in a constant direction and parallel with one another along the whole path of said belt.

4. The system in accordance with claim 1 wherein said belt comprises equal and parallel forward and return runs provided with upper and lower loading planes, respectively, and wherein said belt, at the end of each of said run, rotates in the vertical plane substantially by half a turn thereby passing below the load plane for a distance shorter than the total run of said belt, and then comes back above the load plane without reversing its motion so as to form the starting zone of the other run.

5. The system according to claim 1 characterized in that the loading plane of said belt comprises a set of strips each having bearing structure and vertical pins pivotly connected to said strips at their ends so that said strips can take different slopes with respect to the constant direction of motion, said strips being substantially perpendicular to the direction of motion in the portions where passengers get on and off and being almost parallel to the direction of motion in the high speed zone, an axially sliding sleeve connecting two adjacent strips to each other, a vertical pin connecting said bearing structure of said one strip to said sleeve, said vertical pin allowing relative angular displacements of said strips and a shaft fastened to said bearing structure of said other strip for slidably supporting said sleeve.

6. The system according to claim 1 wherein each said guide is formed by two double rails and wherein there is further included bogies rotatably connected to said vertical pins on which said strips are mounted, said bogies having substantially the form of forks, three wheels mounted on the walls of said forks, one of said wheels engaging the lower tread and the other wheels engaging the upper tread of said double rails.

7. The system according to claim 1 wherein each said guide is formed by two double rails and where there is further included bogies rotatably secured to said vertical pins on which said strips are mounted, said bogies having substantially the form of forks, three wheels mounted on one of said walls of said forks, one said wheel engaging the lower tread and the other two wheels engaging the upper tread of said double rails, two superimposed wheels bearing against the other wall of said fork and, respectively, engaging the upper and lower treads of said double rails, the groups of two wheels alternating with the groups of three wheels.

8. The system according to claim 1 in which said vertical pins on which said strips are mounted jut out of said loading plane and form rods which the passengers can hold and further including auxiliary rods connected to said bars of said strips, said auxiliary rods being interposed between said rods.

9. A system for the continuous conveyance of passengers and/or goods, said system comprising at least one belt having forward and return runs travelling in substantially opposite directions and connected at their ends so that said belt follows a closed path, said belt having a loading plane of constant width which moves at a speed which is very low in at least two end zones and which is constant and high in at least one intermediate zone, said speed gradually changing from one zone to another, and wherein said loading plane is divided into a plurality of sections each comprising a set of contiguous strips transverse the direction of movement of said belt, and hingedly connected to one another, the number of said strips in each section of said loading plane varying according to the speed, sets of hingedly connected, jointed rods all of the same length supporting said loading plane, said rods being in vertical planes at both sides of said loading plane, said joints of said rods of every system moving along guides whose distance progressively decreases from said end portions towards the central, steady-speed portion and keeps constant along the whole length thereof so that said joints are very close to each other in said end portions and progressively more and more apart in said steady-spaced portion.

10. The system according to claim 9 characterized in that said rods are connected so as to form parallelogram articulations each two adjacent pairs of which have a common joint, all said joints common to adjacent articulations moving on said same guide, whereas said other two joints of every articulation move respectively on said two guides placed on opposite sides with respect to said guide of said common joints, said central guide being rectilinear and the other two guides being symmetrical with respect thereto.

11. The system according to claim 9 characterized in that said rods are connected so as to form parallelogram articulations each two pairs of which have a common joint, all said joints common to adjacent articulations moving on said same guide, whereas said two other joints of every articulation move respectively on two guides placed on opposite sides with respect to the guide of the common joints and in that the upper guide is rectilinear and the other two progressively approach or depart therefrom.

12. The system according to claim 9 characterized in that the corresponding joints of each said two sets of articulations are connected by axles, there being further provided bogies having wheels carried by said axles, and double tread rails, said rails defining said guides and engaging said wheels.

13. The system according to claim 9 further including a first axle fastened to one end of each section of the loading plane for connecting the upper joints of two articulations corresponding in the two sets, a second axle and springs fastened to the other end of the loading plane for connecting the lower joints of the subsequent articulations, a third axle for supporting every section in an intermediate portion and for connecting the upper joints of said subsequent articulations, the upper surface of said sections being provided with grooves parallel to the direction of the motion of the belt.

14. The system according to claim 13 characterized by two side bars connected to said axle in every section, said end strip opposite said spring being fastened to said axle connecting the upper joints of the corresponding articulations, said strip being provided with protruding teeth engaging without contact the grooves of the adjacent section thereby providing the continuity of the loading plane.

15. The system according to claim 13 characterized by wheels idly mounted on said axle connecting the upper joints of two correspoinding articulations with the intermediate portion of every section resting on said wheels, the surface of said wheels being provided with grooves parallel to the axis of said wheel which grooves are engaged by the bottom surface of said strips and said lugs connecting adjacent strips.

16. The system according to claim 9 characterized by pins and lugs connecting said strips to one another in at least two points, each such connection making the plane perfectly rigid for downward forces and completely flexible for upward forces.

17. The system according to claim 9 further comprising rods to which passengers can hold on, said rods being supported by said joints of the articulations and connected to each other.

* * * * *